(12) United States Patent  
Morein

(10) Patent No.: US 6,492,987 B1
(45) Date of Patent: Dec. 10, 2002

(54) METHOD AND APPARATUS FOR PROCESSING OBJECT ELEMENTS THAT ARE BEING RENDERED

(75) Inventor: Stephen L. Morein, Cambridge, MA (US)

(73) Assignee: ATI Technologies, Inc., Thornhill (CA)

( * ) Notice: Subject to any disclaimer, the term of this patent is extended or adjusted under 35 U.S.C. 154(b) by 0 days.

(21) Appl. No.: 09/140,930

(22) Filed: Aug. 27, 1998

(51) Int. Cl.[7] .............................. G06T 15/40
(52) U.S. Cl. ...................................... 345/422
(58) Field of Search ........................ 345/422

(56) References Cited

U.S. PATENT DOCUMENTS

| | | | |
|---|---|---|---|
| 4,855,938 A | 8/1989 | Gonzalez-Lopez et al. | |
| 5,268,995 A | 12/1993 | Diefendorff et al. | |
| 5,734,806 A | 3/1998 | Narayanaswami | |
| 5,760,780 A | * 6/1998 | Larson et al. | 345/422 |
| 5,819,017 A | 10/1998 | Akeley et al. | |
| 5,977,980 A | * 11/1999 | Aleksicy | 345/422 |
| 5,982,376 A | * 11/1999 | Abe et al. | 345/422 |
| 6,037,946 A | * 3/2000 | Takeda | 345/422 |
| 6,084,591 A | * 7/2000 | Aleksic | 345/422 |
| 6,160,557 A | * 12/2000 | Narayanaswami | 345/422 |

OTHER PUBLICATIONS

Zhang et al., "Visibility Culling using Hierarchical Occlusion Maps", Computer Graphics–Proceedings, pps. 77–88, Aug. 3, 1997.*
Greene et al., "Hierarchical Z–Buffer Visibility", Computer Graphics–Proceedings, pps. 231–236, Aug. 1, 1993.*

* cited by examiner

*Primary Examiner*—Matthew Luu
*Assistant Examiner*—Motilewa Good-Johnson
(74) *Attorney, Agent, or Firm*—Vedder, Price, Kaufman & Kammholz

(57) ABSTRACT

A method and apparatus for processing object elements as they are being rendered begins by comparing geometric properties (e.g., the Z value) of at least one object element with a representative geometric property for a group of pixels. The group of pixels is determined based on physical coordinates (i.e., the coordinates of a display) that are inclusive of the physical coordinates of the object element. When the comparison of the geometric properties of the object element compares unfavorably with the representative geometric property for the group of pixels, the object-element is rendered and a Z buffer is updated with new Z buffer information. At a given point during the rendering of the object-element, a new representative geometric property is determined based on the updated Z value. Once the new representative geometric property is determined, the representative geometric property is updated with that new value.

19 Claims, 4 Drawing Sheets

METHOD AND APPARATUS FOR PROCESSING OBJECT ELEMENTS THAT ARE BEING RENDERED

TECHNICAL FIELD OF THE INVENTION

This invention relates generally to video graphics circuitry and more particularly to rendering objects by the video graphics circuitry.

BACKGROUND OF THE INVENTION

Computer systems are known to include a central processing unit, video graphics circuitry, audio processing circuitry, and peripheral ports. The peripheral ports allow the central processing unit to interact with peripheral devices such as monitors, printers, external tape drives, etc. The video graphics circuitry is operably coupled to receive geometric information from the central processing unit. The geometric information defines objects to be rendered by the video graphics circuitry. Typically, the objects to be rendered correspond to a particular application being performed by the central processing unit. Such applications include word processing applications, spreadsheet applications, presentation applications, drawing applications, video games, etc.

The video graphics circuitry processes the geometric information to produce pixel data that is subsequently provided to the display. The processing of the geometric information includes a pixel by pixel generation of pixel data and z value processing. The z value processing compares, on a pixel by pixel basis, the perceived depth of the current object element (e.g., a triangle) with previously rendered object elements at corresponding pixels. If the perceived depth of the current object element at a given pixel is in a more foreground position that the previously rendered object elements at the given pixel, a corresponding location in a Z buffer is updated with the z value of the current object element. In addition, the pixel data for the current object element is stored in a frame buffer at a location corresponding to the given pixel. If the perceived depth of the current object element at the given pixel is not in a more foreground position than the previously rendered object elements at the given pixel, the Z buffer is not updated. In addition, the pixel data for the object element at the given pixel is discarded.

Regardless of whether the Z buffer is updated and the pixel data of a currently processed object element is stored in the frame buffer, the processing is done at the pixel level. As such, if an entire object were in a background position with respect to previously rendered objects, each pixel of the object would need to be processed to make such a determination.

Therefore, a need exists for a method and apparatus that reduces the computational overhead for determining perceived depth (i.e., z value) of currently processed object elements.

DETAILED DESCRIPTION OF THE DRAWINGS

Generally, the present invention provides a method and apparatus for processing object elements as they are being rendered. Such processing begins by comparing geometric properties (e.g., the Z value) of at least one object element with a representative geometric property for a group of pixels. The group of pixels is determined based on physical coordinates (i.e., the coordinates of a display) that are inclusive of the physical coordinates of the object element. When the comparison of the geometric properties of the object element compares unfavorably with the representative geometric property for the group of pixels, the object-element is rendered and a Z buffer is updated with new Z buffer information. In other words, if at least a portion of the object element is in a more foreground position than previously rendered object elements in the same physical area of the display, the object-element is rendered. In addition, corresponding pixel locations of the object element that are in a foreground position with respect to previously rendered object elements are updated with the pixel of the currently rendered object element. At a given point during the rendering of the object-element, a new representative geometric property is determined based on the updated Z value. Once the new representative geometric property is determined, the representative geometric property is updated with that new value. With such a method and apparatus, rendering determinations (i.e., whether to render or not) may be made at the object-element level (e.g., at the triangle level) as opposed to at the pixel level, which save significant processing time.

Figure 1:
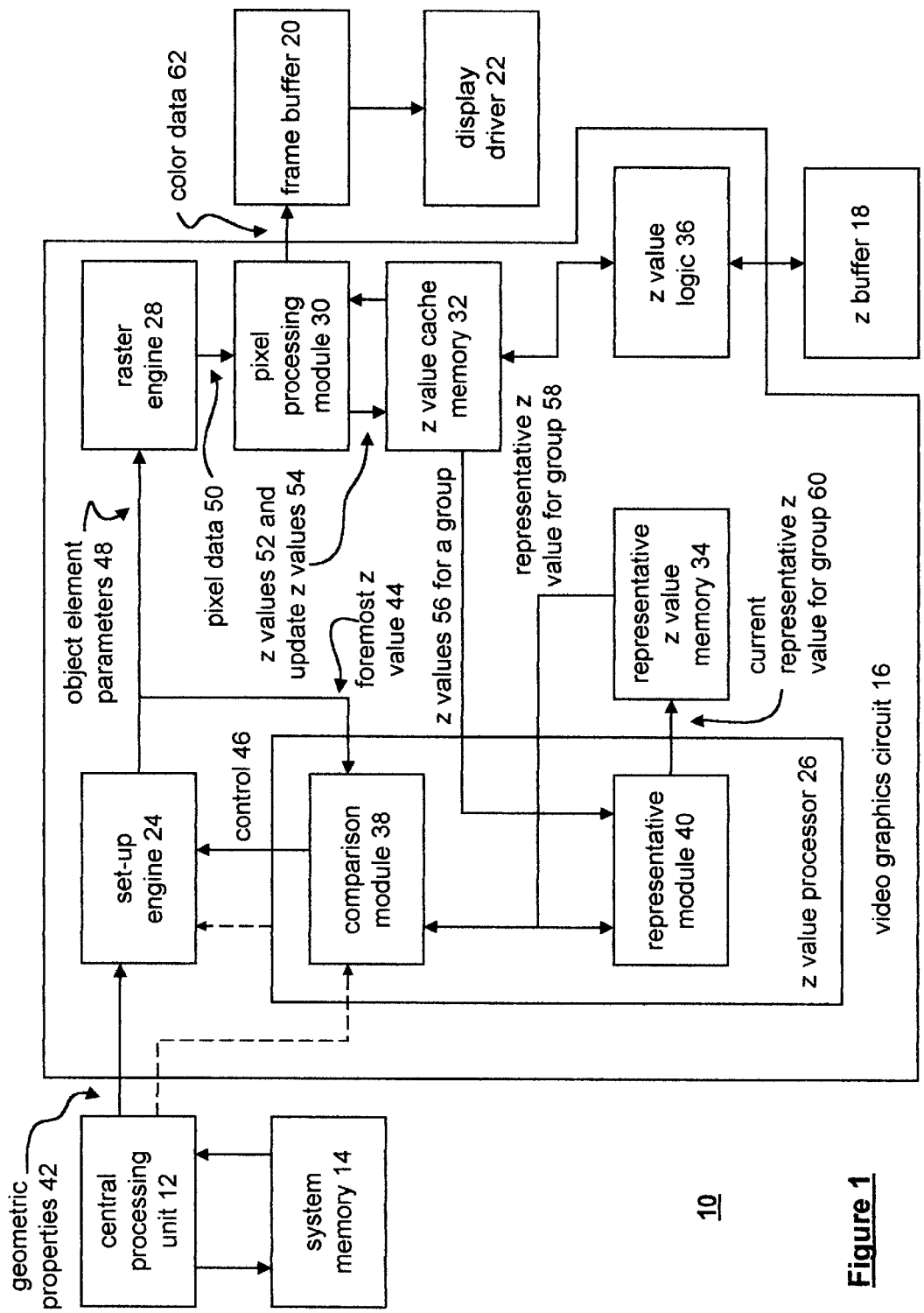
FIG. 1 illustrates a schematic block diagram of a computer in accordance with the present invention.

The present invention can be more fully described with reference to FIGS. 1 through 5. FIG. 1 illustrates a schematic block diagram of a computer 10 that includes a central processing unit 12, system memory 14, a video graphics circuit 16, a Z buffer 18, a frame buffer 20, and a display driver 22. The central processing unit 12 and system memory 14 may be a central processing unit and system memory as found in a personal computer, work station, hand-held computer, laptop computer, or any similar type of computing device. The Z buffer 18 and frame buffer 22 contain sufficient memory locations to map the physical coordinates of a display (not shown). The mapping of memory locations to the physical coordinates may be done linearly or in a tiled manner. In either mapping convention, the Z buffer 18 (which contains relative depth information to determine depth relationships between object elements, done by Z buffering, W buffering and range based) and the frame buffer 22 each have a one-to-one correlation between entries contained therein and pixel locations, as identified by physical coordinates, on the display.

The video graphics circuit 16 includes a set-up engine 24, a Z value processor 26, a raster engine 28, a pixel processing module 30, a Z value cache memory 32, a representative Z value memory 34, and Z value logic 36. The Z value processor 26 functions as a comparison module 38 and a representative module 40.

In operation, when the central processing unit is processing an application, it produces geometric properties 42 that are provided to the video graphic circuit 16. The geographic properties 42 provide specific data regarding objects that are to be rendered on the display. Note that the video graphics circuit 16 may be coupled to receive the geometric properties 42 via the set-up engine 24 or via the Z value processor 26. When the video graphics circuit 15 is operably coupled to receive the geometric properties 42 via the Z value processor 26, the comparison module 38 determines whether the geometric properties 42 will be subsequently provided to the set-up engine 24. For example, if the geometric properties 42 correspond to an object element that is determined to be in a background position with respect to previously rendered object elements, the comparison module would prevent the geometric properties 42 from being provided to the set-up engine 24. Instead, the comparison module 38 would initiate the retrieval of the geometric properties 42 for another object element and perform a similar comparison, thus saving significant processing time by not rendering the object element by the remainder of the video graphics circuit 16 only to determine that the object element is in a background position.

When the video graphics circuit 16 is operably coupled to receive the geometric properties 42 via the set-up engine 24, the comparison module 38 obtains a foremost Z value 44 from the set-up engine 24. The comparison module 38 compares the foremost Z value of the currently rendered object-element with the representative Z value for a group of pixels 58. Note that the group of pixels has physical coordinates that are inclusive of the object element being currently rendered. If the foremost Z value 44 has a more background position than the representative Z value for the group 58, the comparison module 38 generates a control signal 46 which causes the set-up engine 24 to discard the current object element. If however, the foremost Z value 44 of the current object element is in a foreground position with respect to the representative Z value for the group 58, the object-element parameters 48 are provided to the raster engine 28. Note that the object-element parameters 48 include vertex information, color information, texel coordinates, etc. that have been derived from the geometric properties 42 by the set-up engine 24.

The raster engine 28 processes the object-element parameters 48 to produce pixel data 50. The pixel data 50 relates the object-element parameters 48 to a pixel by pixel basis for the object element being rendered. The pixel processing module 30 is operably coupled to receive the pixel data 50 and to produce therefrom color data 62. The color data, which may be a combination of texture information, color information, alpha blending data, etc. is stored in the frame buffer 20. When a full-frame of data is stored in frame-buffer 20, it is provided to the display driver 22, which subsequently routes it to a display device. In addition, the pixel processing module 30, processes Z values 52 and updates the Z values 54 when the Z value 52 for the currently rendered object-element is in a foreground position of a previously rendered object-element. Such processing is done on a pixel by pixel basis. The Z values 52 and the updated Z values 54 are temporarily stored in the Z value cache memory 32.

When the object element has been rendered, Z values for the group 56 are provided to the representative module 40. The representative module, on a pixel by pixel basis, determines a representative Z value for a grouping of pixels 58. If the group of pixels has a new most foreground Z value, the representative Z value for the group 58 will be updated with that new Z value, thereby producing a current representative Z value for the group 60.

The Z values stored in cache memory 32 are subsequently provided to the Z buffer 18 via the Z logic circuit 36. In essence, the Z value logic circuit 36 coordinates the caching of the Z values between the cache memory 32 and the Z buffer 18.

As configured, the video graphics circuit 16 determines, at an object-element (e.g., triangle) level, whether the object-element is in a background position with previously rendered object-elements. If so, the pixel level processing of the object-element can be avoided. Thus, the only pixel level processing that is done by video graphic circuit 16 is for object-elements that are at least partially in a foreground position with respect to previously rendered object-elements. As such, any unnecessary pixel level processing of object-elements that are in a background position is avoided. As one can imagine, this saves a significant amount of processing time and improves the processing capabilities of the video graphics circuit 16.

Figure 2:
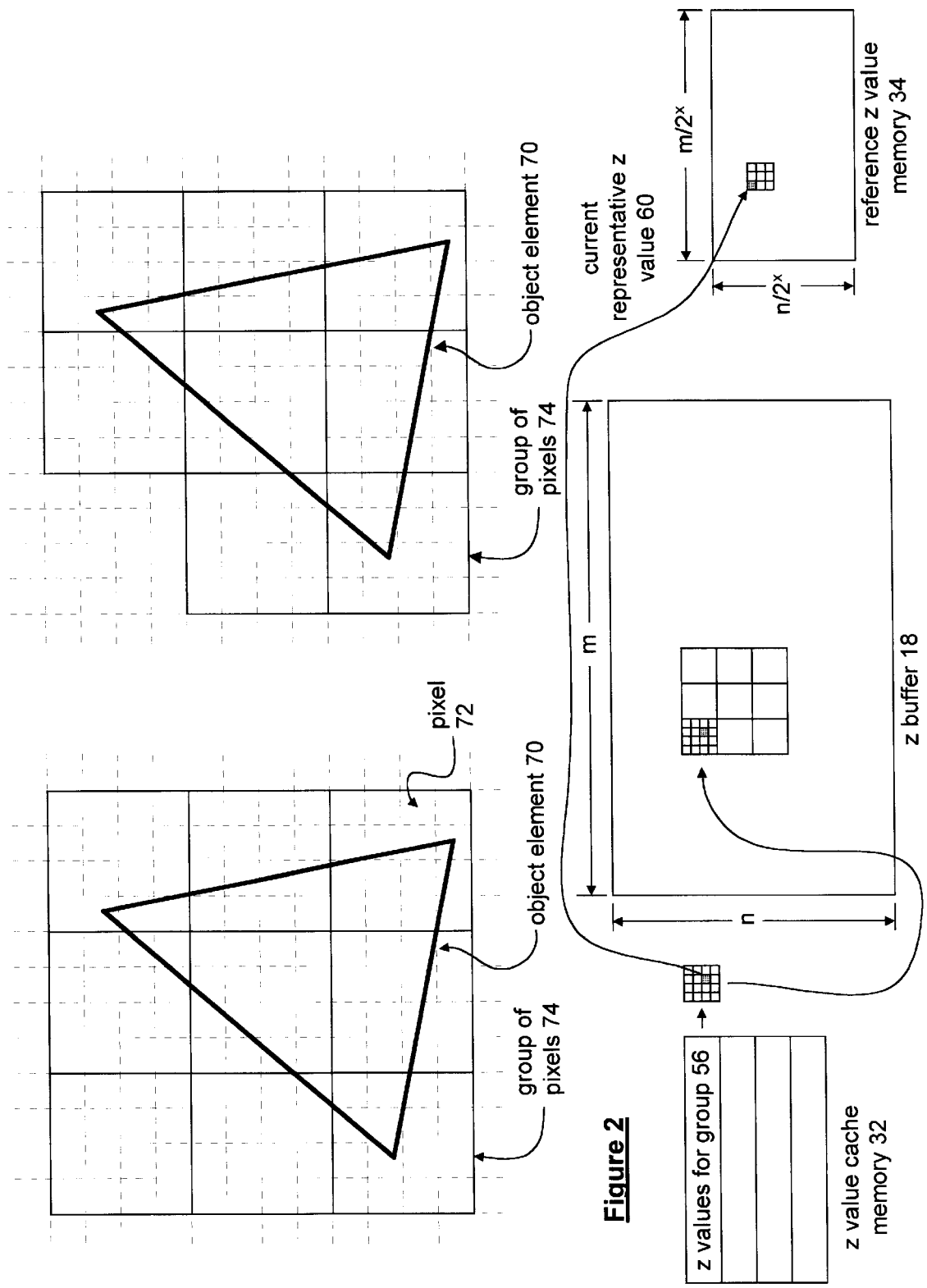
FIG. 2 illustrates a graphical representation of processing an object element in accordance with the present invention.

FIG. 2 illustrates a graphical representation of the object-element level processing of the video graphic circuit 16. As shown in the upper-left portion of FIG. 2, an object-element 70 is to be rendered covering a plurality of pixels 72. The plurality of pixels 72 is divided into groups of pixels 74, where each group includes 4×4 pixels. As one of average skill in the art would appreciate, the number of pixels within a group maybe more or less than the 4×4 indicated in the illustration of FIG. 2 and the grouping does not need to include the pixels in the square geometry. As a first step in rendering the object-element 70, the groups of pixels 74 that have physical coordinates relating to the object-element 70 are identified. One technique for identifying the groups would be to produce a rectangular grouping of the groups that are inclusive of the object element 70. This is illustrated in the upper-left portion of FIG. 2. Note that the upper-left most group of pixels is not touched by the object-element 70. An alternate technique for identifying the group of pixels would include walking the edges of the object element to identify the groups. Using this technique, only those groups that are inclusive of at least a portion of the object element are processed, thus saving additional processing steps. This is illustrated in the upper-right portion of FIG. 2.

The bottom portion of FIG. 2 illustrates the Z values for a group 56 of pixels that are stored in the cache memory 32. These Z values have been retrieved from the Z buffer and correspond to previously rendered object elements. For this group, which is shown by a 4×4 block of pixels, the backmost Z value is selected as the representative Z value 56. This is illustrated by the shaded pixel. The representative Z values for the other groups of pixels are obtained in a similar manner. Once all of the representative Z values have been obtained, they are compared with the foremost Z value of the object-element 70. If the foremost Z value is in a background position with respect to all of the representative Z values (i.e., the backmost Z values), the object-element is in a background position with respect to the groups of pixels and can be discarded. If not, the object-element is rendered and the Z values are updated in the Z value cache memory 32. As this is occurring the Z values for a group of pixels 56 are updated in the Z value cache memory 32. Once the object-element 70 has been rendered corresponding to a group of pixels, the Z values are provided to the Z buffer 18 and stored in a corresponding address. In addition, a current representative Z value 60 is determined from the newly-updated Z values. The representative Z value, which, as shown, has a compression of 16-1, is stored in the reference Z value memory 34. By having a single reference Z value represent a group of pixels, only one comparison needs to be performed to determine a foreground-background relationship for the portion of the object element covering the group of pixels as opposed to the pixel level processing that compares each pixel. Note that the reference Z value memory 34 is sized as a function of the size of the Z buffer 18. As shown, the function is $\frac{1}{2}^x$.

Figure 3:
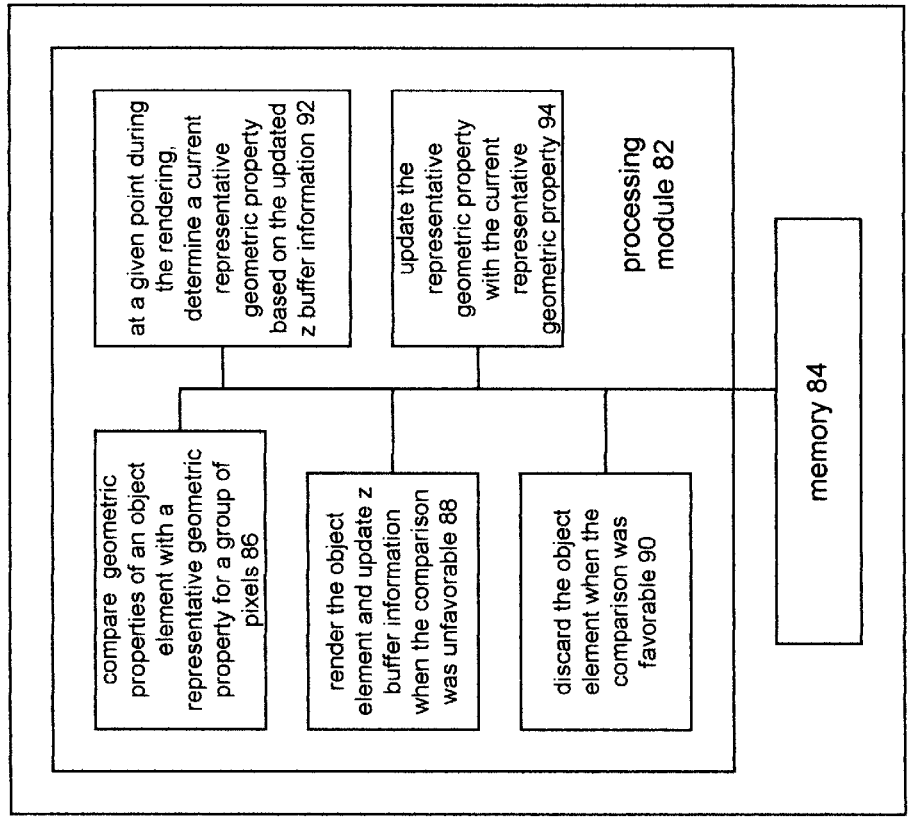
FIG. 3 illustrates a schematic block diagram of a video graphics processor in accordance with the present invention.

FIG. 3 illustrates a schematic block diagram of a video graphics processor 80 that includes a processing module 82 and memory 84. The processing module 82 may be implemented by a single processing entity or a plurality of processing entities. Such a processing entity may be a microprocessor, microcomputer, microcontroller, digital signal processor, central processing unit, state machine and/or any device that manipulates digital information based on operational instructions. The memory 94 may be read-only memory, random access memory, floppy disk memory, hard drive memory, magnetic tape memory, CD memory, DVD memory, and/or any device that stores digital information. Note that if the processing module includes a state machine to perform one or more of its functions, the operating instructions corresponding to that function are embedded within the logic circuitry making up the state machine.

The memory 84 stores operating instructions that cause the processing module 82 to function as a plurality of circuits 86-94. The processing module functions as circuit 86 to compare geometric properties of an object-element with a representative geometric property for a group of pixels. The processing module then functions as circuit 88 to render the object element and update Z buffer information when the comparison was unfavorable. The processing module 82 then functions as circuit 90 to discard the object-element when the comparison was favorable. The processing module then functions as circuit 92 which determines, at a given point during the rendering of the object-element, a current representative geometric property based on the updated Z buffer. The processing module then functions as circuit 94 to update the representative geometric property with the current representative geometric property. The operating instructions stored in memory 84 and executed by processing module 82 will be discussed in greater detail with reference to FIG. 4 and FIG. 5.

Figure 4:
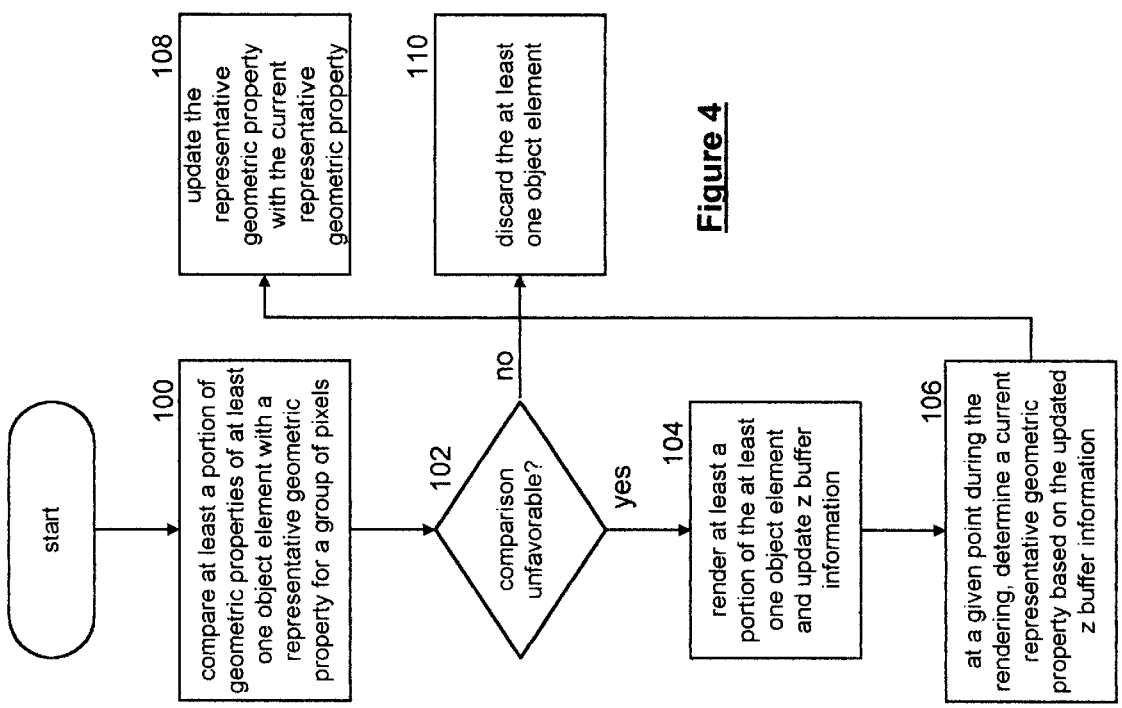
FIG. 4 illustrates a logic diagram of a method for processing object elements in accordance with the present invention.

FIG. 4 illustrates a logic diagram of a method for processing object-elements as they are being rendered in accordance with the present invention. The process begins at step 100 where at least a portion of geometric properties of at least one object-element is compared with a representative geometric property for a group of pixels. The particular group of pixels is determined based on the physical coordinates of the object-element being rendered. Note that the geometric properties include a Z value, or Z value information, for pixels of the object-element being rendered, where the pixels have physical coordinates corresponding to pixels identified within the group of pixels. If the geometric property that is being used for comparison is the Z value, the foremost Z value of the object-element being rendered is compared with the representative Z value of the group of pixels. The representative Z value of the group of pixels corresponds to the backmost Z value of previously rendered object-elements at the physical coordinates corresponding to the group of pixels.

The process then proceeds to step 102 where a determination is made as to whether the comparison was unfavorable. If the comparison was not unfavorable, the process proceeds to step 110 where the object-element to be rendered is discarded. As such, if the object-element being rendered is in a background position with respect to previously rendered object-elements, the object-element does not need to be rendered at the pixel level. Note that the comparison of step 102 is done for each group of pixels that have corresponding physical coordinates with the object-element. As such, if the object-element has an unfavorable comparison for one of a plurality of group of pixels, the process proceeds to step 104.

At step 104 at least a portion of the object-element is rendered and the Z buffer information is updated accordingly. The updated Z buffer information is provided to a cache memory, where a line of the cache memory stores the updated Z buffer information for the group of pixels. The process then proceeds to step 106 where, at a given point during the rendering, a current representative geometric property is determined based on the updated Z buffer information. The given point may be identified as being subsequent in the time to the line of cache memory storing the updated Z buffer information for the group of pixels. As such any time after the cache memory has a line's worth of data, corresponding to a particular group of pixels, the representative Z value may be obtained for that group of pixels. Alternatively, the given point may be identified based on processing of the object-elements. For example, if a relatively small triangle is being rendered, a full line of cache memory will not be affected. As such, the trigger point needs to be based on the object as opposed to a cache line fill. As yet another alternative, the given point may be based on identifying a cache flush request from the central processing unit.

The process then proceeds to step 108 where the representative geometric property is updated with the current representative geometric property. Note that the representative geometric property may correspond to a back most Z value for the group of pixels. The processing steps of 100 through 108 may be repeated for other portions of the display (i.e., other groups of pixels). Alternatively, the repeating of steps 100 through 108 may be done based on the representative Z value memory size, and/or a ratio of display does not fit within the second level memory. In other words, the complete display area is not subdivided into groups of pixels, only a portion of the display is divided into groups of pixels based on the linear relationship between the Z buffer 18 and the referenced Z value memory 34. To maintain the geometric relationship between the Z buffer 18 and the reference Z value 34, the size of the reference Z value should be a function of $2^x$ to the size of the Z buffer 18. This was illustrated in FIG. 2.

Figure 5:
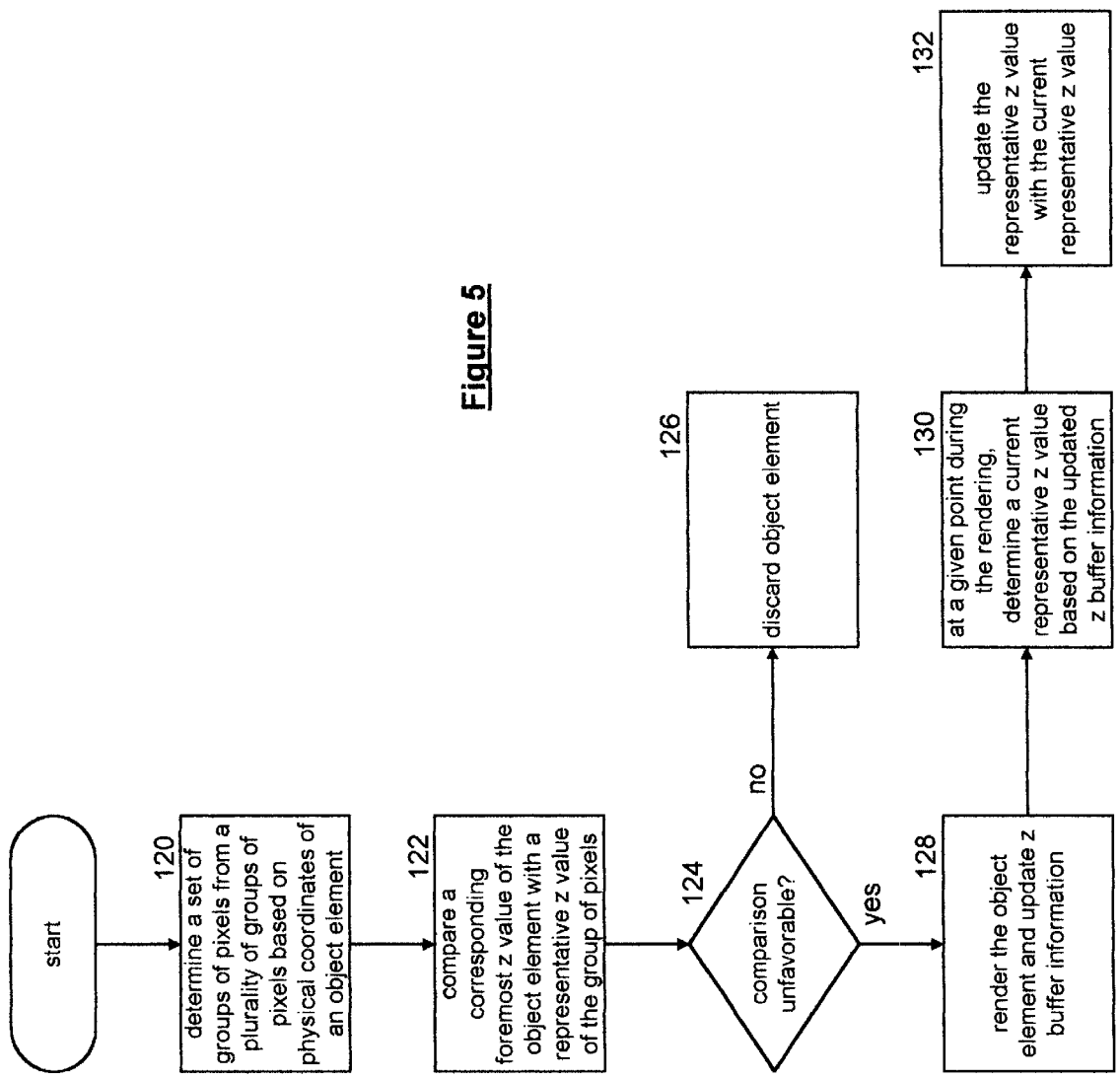
FIG. 5 illustrates a logic diagram of an alternate method for processing object elements in accordance with the present invention.

FIG. 5 illustrates a logic diagram of another method for processing object-elements as they are being rendered in accordance with the present invention. The process begins at step 120 where a set of groups of pixels are determined from a plurality of groups of pixels based on physical coordinates of an object-element being rendered. This was illustrated with reference to FIG. 2 wherein several groups of pixels were identified based on the object element being rendered. The process then proceeds to step 122 where a corresponding foremost Z value of the object-element is compared with a representative Z value of the groups of pixels. The corresponding foremost Z value is a foremost Z value for at least a portion of the object-element having physical coordinates that are at least proximal to the group of pixels. As such, as shown in FIG. 2, the portion of the object-element that covers a group of pixels is used to determine the foremost Z value of that portion of the object-element. That foremost Z value for a corresponding portion of the object-element is compared with the backmost Z value of the group of pixels.

The process then proceeds to step 124 where a determination is made as to whether the comparison was unfavorable. If not, the process proceeds to step 126 where the object-element is discarded (i.e., not processed at the pixel level). If, however, the comparison was unfavorable, the process proceeds to step 128 where the object-element is rendered and the Z buffer information is updated. The updated Z buffer information is provided to a cache memory, where a line of the cache memory stores the updated Z buffer information for the group of pixels. The process then proceeds to step 130, where, at a given point during the rendering, a current representative Z value is determined based on the updated Z buffer information. The given point may be identified at a time subsequent to when the line of the cache memory has stored the updated Z buffer information for the group of pixels.

The process then proceeds to step 132 where the representative Z value is updated with the current representative Z value. Note that the representative Z value corresponds to a back most Z value for the group of pixels. Further note that steps 120–132 may be repeated for a portion of the display or the entire display. If the steps are repeated for a portion of the display, only the portion of the display is divided into groups.

The preceding discussion has presented a method and apparatus for processing object-elements (e.g., triangles) at the object-element level. If, at the object-element level, an object-element is determined to be in a background position with respect to previously rendered object-elements, it is discarded. Once discarded, the object-element is not processed at the pixel level. Thus, pixel level processing is avoided thereby saving processing time and bandwidth of the video processing circuitry.

What is claimed is:

1. A method for processing object elements that are to be rendered on a display, the method comprises the steps of:
   a) comparing at least a front most portion of geometric properties of at least one group of pixels that are inclusive of at least one of the object elements with a backmost Z value for a group of pixels, wherein the geometric properties include physical coordinates that correlate within the given group of pixels, when the comparing is not unfavorable, discarding the at least one of the object elements associated with the front most portion;
   b) when the comparing of step (a) is unfavorable, rendering at least a portion of the at least one of the object elements and updating z buffer information to produce updated z buffer information;
   c) at a given point during the rendering of the at least a portion of the at least one of the object elements, determining a current backmost Z value for a group of pixels based on the updated z buffer information; and
   d) updating the backmost z values with the current backmost z value.

2. The method of claim 1, wherein the geometric properties include z value information for pixels of the at least one of the object elements, wherein the pixel have physical coordinates within the group of pixels.

3. The method of claim 1, wherein step (c) further comprises identifying the given point based on processing of the object elements.

4. The method of claim 1, wherein step (c) further comprises determining the current representative geometric property by determining a backmost z value corresponding to the group of pixels.

5. The method of claim 1 further comprises performing steps (a) through (d) for a portion of the display.

6. The method of claim 1, wherein step (a) further comprises:
   comparing the geometric properties of a foremost pixel of the at least one of the object elements with the representative geometric property, wherein the foremost pixel has physical coordinates within the group of pixels.

7. A video graphics processor comprises:
   a raster engine operably coupled to receive object element parameters of an object element and to produce therefrom pixel data;
   a pixel processing module operably coupled to receive the pixel data and to produce therefrom a z value and color data for each pixel of the object element, wherein the pixel processing module processes the z values corresponding to the object element along with previously stored z values having corresponding physical coordinates to produce updated z values;
   a z value cache memory operably coupled to store the updated z values for a group of pixels, wherein physical coordinates of the object element are at least partially inclusive of the group of pixels;
   a representative z value memory that stores a plurality of representative z values, wherein each of the plurality of representative z values is for a corresponding one of a plurality of a group of pixels that includes the group of pixels;
   z value processor operably coupled to control the object element parameters of the object element being provided to the raster engine when a foremost z value of the object element compares unfavorably to the representative z value of the group of pixels, wherein the z value processor includes:
      a comparison module that compares the foremost z value with the representative value of the group of pixels, wherein the comparison module controls the object element parameters of the object element being provided to the raster engine when the comparing was unfavorable; and
      a representative module operably coupled to the z cache memory and the reference z value memory, wherein the representative module, at a given point during processing of the object element by the pixel processing module, determines a current representative z value for the group of pixels based on the z values corresponding to the group of pixels stored in the z cache memory and provides the current representative z value of the reference z value memory, the representative module further comprising means for identifying the given point to be subsequent in time to a line of the z value cache memory containing the updated z values for the group of pixels.

8. The video graphics processor of claim 7 further comprises:
   a set-up engine operably coupled to the z value processor and the raster engine, wherein the set-up engine receives geometric parameters of the object element and produces therefrom, the object element parameters, wherein the z value processor receives the object element parameters from the set-up engine and provides the object element parameters to the raster engine when the comparing of the foremost z value with the representative z value was unfavorable.

9. The video graphics processor of claim 7 further comprises:
   a set-up engine operably coupled to the z value processor and the raster engine, wherein the set-up engine receives geometric parameters of the object element and produces therefrom, the object element parameters, wherein the z value processor receives the geometric parameters and provides the geometric parameters to the set-up engine when the comparing of the foremost z value with the representative z value was unfavorable.

10. The video graphics processor of claim 7 further comprises an integrated circuit construction.

11. The video graphics processor of claim 7, wherein the comparison module does not provide the object element parameters to the raster engine when the comparing of the foremost z value with the representative z value is favorable.

12. The video graphics processor of claim 7, wherein the representative module further comprises means for determining the current representative z value by determining a backmost pixel value corresponding to the group of pixels.

13. A method for processing object elements that are to be rendered, the method comprises the steps of:
   a) determining a set of groups of pixels from a plurality of groups of pixels based on physical coordinates of an object element;
   for each group of pixels in the set of groups of pixels:
   b) comparing a corresponding foremost z value of the object element with a representative value of the group of pixels, wherein the corresponding foremost z value is a foremost z value for at least a portion of the object element having physical coordinates that are at least proximal to the group of pixels;
   c) when the comparing of step (b) is unfavorable for any of the group of pixels, rendering of the at least a portion of the object element and updating z buffer information for the group of pixels to produce updated z buffer information and providing the updated z buffer information to a cache memory wherein a line of the cache memory stores the updated z information for the group of pixels;
   d) at a given point during the rendering of the at least a portion of the object element, determining a current representative z value based on the updated z buffer information;
   e) updating the representative z value with the current representative value; and
   f) identifying the given point to be subsequent in time to the line of cache memory storing the updated z buffer information for the group of pixels.

14. The method of claim 13, wherein step (d) further comprises determining the current representative z value by determining a backmost z value corresponding to the group of pixels.

15. The method of claim 13 further comprises performing steps (a) through (e) for a portion of the display.

16. A video graphics processor comprises:
   a processing module; and
   memory operably coupled to the processing module, wherein the memory stores operating instructions that cause the processing module to: (a) compare at least a portion of geometric properties of at least one group of pixels that are inclusive of at least one of the object elements with a representative geometric property for a group of pixels, wherein the geometric properties include physical coordinates that correlate with the given group of pixels; (b) render at least a portion of the at least one of the object elements and update buffer information when the comparing of the at least a portion of the geometric properties with the representative geometric property is unfavorable; (c) at a given point during the rendering of the at least a portion of the at least one of the object elements, determine a current representative geometric property based on the updated z buffer information; and (d) update the representative geometric property with the current representative geometric property and wherein the memory further includes operating instructions that cause the processing module to provide the updated z buffer information to a cache memory, wherein a line of the cache memory stores the updated z information for the group of pixels and to identify the given point to be subsequent in time to the line of cache memory storing the updated z buffer information for the group of pixels.

17. The video graphics processor of claim 16, wherein the memory further comprises operating instructions that cause the processing module to discard the at least one object element when the comparing of the at least a portion of the geometric properties with the representative geometric property is favorable.

18. The video graphics processor of claim 16, wherein the memory further comprises operating instructions that cause the processing module to determine the current representative geometric property by determining a backmost z value corresponding to the group of pixels.

19. The video graphics processor of claim 16, wherein the memory further comprises operating instructions that cause the processing module to:
   compare the geometric properties of a foremost pixel of the at least one of the object elements with the representative geometric property, wherein the foremost pixel has physical coordinates within the group of pixels.

* * * * *